United States Patent
Guillou et al.

(10) Patent No.: US 8,043,988 B2
(45) Date of Patent: Oct. 25, 2011

(54) FAU-STRUCTURAL-TYPE SUPPORTED ZEOLITE MEMBRANES, THEIR PROCESS FOR PREPARATION AND THEIR APPLICATIONS

(75) Inventors: Florent Guillou, Lyons (FR); Gerhard Pirngruber, Charly (FR); Loïc Rouleau, Charly (FR); Valentin Valtchev, Mulhouse (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 212 days.

(21) Appl. No.: 12/219,541

(22) Filed: Jul. 23, 2008

(65) Prior Publication Data
US 2009/0029845 A1 Jan. 29, 2009

(30) Foreign Application Priority Data
Jul. 24, 2007 (FR) ...................... 07 05401

(51) Int. Cl.
*B01J 20/28* (2006.01)
*B01J 29/06* (2006.01)
(52) U.S. Cl. .................. 502/4; 502/60; 502/63; 502/64; 502/66; 502/79

(58) Field of Classification Search ................ 502/60, 502/63, 64, 66, 79, 74, 4
See application file for complete search history.

(56) References Cited

U.S. PATENT DOCUMENTS

| 6,193,784 B1 | 2/2001 | Yazawa et al. | |
| 2003/0084786 A1* | 5/2003 | Chau et al. | 95/45 |
| 2005/0067344 A1* | 3/2005 | Tanaka et al. | 210/490 |
| 2005/0139065 A1* | 6/2005 | Miller et al. | 95/45 |

FOREIGN PATENT DOCUMENTS

| EP | 1 230 972 A | 8/2002 |
| FR | 2 719 238 A | 11/1995 |

OTHER PUBLICATIONS

French Search Report completed Feb. 19, 2008 in French Application No. 0705401 filed Jul. 24, 2007.

\* cited by examiner

*Primary Examiner* — Elizabeth Wood
(74) *Attorney, Agent, or Firm* — Millen, White, Zelano & Branigan, P.C.

(57) ABSTRACT

The invention relates to a FAU-type zeolite membrane that comprises a FAU-type zeolite crystal layer incorporated in the surface porosity of at least one selected face of a porous substrate, in which the ratio between the thickness of said zeolite layer incorporated in the surface porosity of said selected face of the substrate and the total thickness of said zeolite layer is at least 70%. It also relates to processes for preparation and application of these membranes.

15 Claims, No Drawings

FAU-STRUCTURAL-TYPE SUPPORTED ZEOLITE MEMBRANES, THEIR PROCESS FOR PREPARATION AND THEIR APPLICATIONS

The invention relates to FAU-structural-type supported zeolite membranes. It also relates to the processes for preparation of these supported membranes as well as to their applications by separation by size difference of the molecules to be separated (steric exclusion), by difference in the rate of diffusion of the molecules to be separated (kinetic separation), and by difference of chemical affinity with the membrane of the molecules to be separated (thermodynamic separation).

A zeolite is an oxide that has a three-dimensional structure that results from the linking of tetrahedral units leading to a network of channels of molecular dimension, with pore diameters varying from 3 to 10 Å (Ch. Baerlocher, W. M. Meier, D. H. Olson, Atlas of Zeolites Structure Types, $5^{th}$ Edition, Elsevier, 2001). A zeolite is typically a silico-aluminate and is now extended to other compositions leading to a uniform three-dimensional structure, in particular a metallosilicate, such as, for example, alumino-silicate, boro-silicate, ferro-silicate, titano-silicate, alumino-phosphate, gallo-phosphate, and silico-alumino-phosphate.

The zeolites are generally synthesized by carrying—under hydrothermal conditions, at a temperature that is set between 50 and 250° C., for a length of time varying from several hours to several days, under autogenous pressure—an aqueous precursor mixture that contains the sources of the framework elements, a mineralizing source that makes it possible to put framework elements into solution and a structuring source that helps organize them into zeolites. "Framework element" is defined as an element that will form the structural skeleton of the zeolite. In general, the framework elements are in particular silicon, aluminum, boron, iron, titanium, phosphorus and gallium.

PRIOR ART

Processes for developing FAU-structural-type zeolite membranes have already been described. U.S. Pat. No. 5,871,650 thus describes the preparation of zeolite membranes whose FAU-structural-type zeolite phase is found on the outside surface of a porous substrate. It forms a zeolite film, and these membranes are sensitive to thermomechanical constraints. In addition, a drawback of these membranes is that they exhibit an inadequate crystallinity and/or the presence of (an) amorphous zone(s) that entrains unsatisfactory performance levels of molecular separation and in particular an unsatisfactory selectivity.

Attempts to improve the conventional processes have been described in particular in the patent EP 1468725, which describes the implementation of a first inoculation of the substrate by seeds whose secondary growth will later form a homogeneous and fluidtight FAU-type zeolite film almost exclusively on the surface.

One of the difficulties linked to the preparation of zeolite-based membranes resides in particular in the monitoring of the crystallization of the zeolite so as to obtain zeolite crystals that are duly linked to the substrate, located primarily in the pores of the substrate and forming a continuous zeolite/substrate composite layer that is without any intercrystalline pores and that is thin enough to limit the transfer resistance through the membrane material.

SUMMARY OF THE INVENTION

The object of the invention is to obtain, in a controlled and reproducible manner and with a limited failure rate (sealing defect), preferably with a simple process, FAU-type zeolite membranes that exhibit a satisfactory compromise between thinness of the layer and continuity of this layer. The thinness of the layer should be such that the flow rates in use can be high, and the layer should be essentially free of defects such as intercrystalline gaps. In addition, for the membranes according to the invention, the FAU-type zeolite is for the most part in the pores of the substrate. The location of the zeolite in the pores of the substrate combined with the nature of the substrate impart to the membrane an excellent thermal and mechanical stability.

Furthermore, the membranes according to the invention are characterized in general by permeability properties of the zeolite layer: it limits the permeability of molecules that cannot diffuse into the pores of the zeolite because of the very small presence of defects, and it offers in contrast a high permeability for molecules with a high affinity for the framework in the pores of the zeolite, in particular the polar molecules, because of a small thickness of the layer.

DETAILED DESCRIPTION OF THE INVENTION

The invention relates to a FAU-type zeolite membrane that comprises a FAU-type zeolite crystal layer in the surface porosity of at least one of the selected faces of a porous substrate. The ratio between the thickness of the selective zeolite layer detected in the surface porosity of a selected face of the substrate and the total thickness of the selective zeolite layer is at least 70%, and even 80%, and even preferably more than 90%.

The total thickness of the zeolite layer is by definition the zeolite thickness that is detected in the surface porosity added to the zeolite thickness that is detected on the outside of the substrate.

The thicknesses of zeolite layers are generally determined by scanning and/or transmission electron microscopy. They correspond to the mean thickness of the layer of homogeneous and contiguous zeolite crystals that ensure the separation properties of the membrane.

So as to calculate the ratio r between the thickness of the selective zeolite layer detected in the surface porosity of a selected face of the substrate and the total thickness of the selective zeolite layer, between five and ten measurements of the two necessary thicknesses are generally taken so as to calculate a mean for these two thicknesses. Thus, by simple division, the ratio r is obtained. Preferably, between six and nine measurements, preferably seven measurements, are taken. These measurements are taken on membrane images that are obtained by scanning and/or transmission electron microscopy.

For example, if, by taking nine measurements, a mean of seven arbitrary units is obtained for the thickness of the selective zeolite layer detected in the surface porosity of a selected face of the substrate and a mean of ten arbitrary units is found for the total thickness of the selective zeolite layer, the ratio r will be 0.7 or r=70%.

The characterization of the selective nature of a zeolite layer is carried out by means of permeation and gas separation tests on mixtures such as, for example, the carbon dioxide/nitrogen mixtures ($CO_2/N_2$ mixture). Once the characterization of the selective nature of a zeolite layer is carried out, mention is made of, within the framework of this text, selective zeolite layers.

According to a preferred embodiment, the substrate comprises at least one of the compounds selected in the group that consists of ceramics, aluminas, zirconias, silicas, titanium oxide, carbon substrates, metals, metal alloys, preferably stainless steel or aluminum metal alloys. Very preferably, the substrate is made of alumina. The substrate has a porosity in the range of 4 nm to 100 µm, preferably 4 nm to 10 µm, and, more preferably still, 0.1 to 1 µm.

The substrate generally has a homogeneous structure, i.e., at any point of the substrate, the material is identical with regard to its composition, its crystallography and its porosity. It may also exhibit a heterogeneous structure, i.e., the material is not identical at all points of the system but exhibits different juxtaposed zones of identical material.

The form of the substrate is generally selected from the group that consists of tubular forms, planar forms, disks, sheets, multichannel monoliths, and fibers. The substrate is preferably in tubular form, in multichannel monolith form or in fiber form. The substrate is very preferably in tubular or fiber form. Very preferably, it is in the form of hollow fibers whose surface/volume ratio is high.

The total thickness of the selective zeolite layer is generally less than 100 µm, preferably less than 20 µm, and very preferably less than 5 µm.

Processes for Preparation of the Membrane

Conventionally, the zeolite membranes are prepared by various methods, in particular by direct synthesis of zeolite on the substrate or indirect synthesis with a preliminary deposition of zeolite seeds on the substrate, then growth of the latter. The so-called direct methods comprise only in-situ processes for the formation of the membrane. The so-called indirect methods comprise, in general, at least one ex-situ operation, such as, for example, the deposition of seeds on the substrate that are not produced by the reaction medium or the dispersion of seeds in the reaction medium.

The preparation methods generally comprise the preparation of the precursor mixture that is necessary to the formation of the zeolite, bringing the precursor mixture into contact with the substrate, optionally inoculated with seeds in the case of indirect synthesis, the synthesis of the zeolite under hydrothermal conditions, then optionally the liberation of the porosity of the zeolite by calcination or modifications of the zeolite by ion exchange.

The FAU-structural-type NaX and NaY zeolites can be synthesized from a clear solution, i.e., from a solution wherein the precursors cannot be seen in suspension. They can be synthesized in an aqueous medium from a silica and aluminum source as framework elements, a hydroxide source as a mineralizing agent, and a TMA and/or Na source as a structuring agent.

The FAU-structural-type NaX and NaY zeolites can also be synthesized from a gel or a suspension of agglomerated gel particles, i.e., a suspension or a gel that consists of aluminum and silicon sources that are polymerized with one another in the absence of structuring organic compounds. They can be synthesized in aqueous medium from a source of silicon and aluminum as framework elements, a hydroxide source as a mineralizing agent, and $Na^+$ as a structurant.

In a general manner, an inoculated substrate is a substrate on which are applied seeds for the purpose of a secondary growth. This input of seeds can be achieved by means of seeds that are prepared in advance and then deposited by various mechanical means and preferably by means of seeds that are synthesized in situ on the surface and in the pores of the substrate, for example by the procedure that is the object of this invention.

The membranes of the invention can be prepared using a process that generally comprises:

Stage a)

The preparation of a gel-type or gel-suspension-type precursor that comprises at least one silicon source, at least one source of another framework element, at least one mineralizing agent, and at least water. In addition, the precursor generally also comprises one or more structuring organic compounds that optionally can also be used as a mineralizing agent.

In general, at the end of stage a), the molar composition of the gel-type or gel-suspension-type precursor is as follows:

1 $SiO_2$—w another framework element—x $H_2O$—y $Na_2O$—z structuring organic compound w, x, y and z that respectively represent the molar ratios (another framework element)/silica, water/silica, soda/silica (structuring organic compound)/silica.

w between 0 and 1, preferably between 0 and 0.5. Very preferably, w is between 0.07 and 0.3 for the alumina.

x between 5 and 1000, preferably between 15 and 300.

y between 0 and 80, preferably between 0.2 and 60, very preferably between 0.4 and 10. Preferably, y is between 1 and 8 for the gel-type and gel-suspension-type precursors. Preferably, y is between 0 and 1, and even between 0 and 0.5 for the clear-solution-type precursors.

z between 0 and 5, preferably between 0 and 3.

In the aforesaid ranges of molar ratios, the limits are included but ranges starting with above zero are also contemplated.

Before its gelling, the gel precursor or the gel suspension generally comes in clear liquid form.

Once the sources of silicon and another framework element are combined, the latter will generally polymerize. The polymerization reaction is generally controlled kinetically in such a way that the polymerization time depends on the temperature.

The preparation temperature of the precursor is generally a temperature of less than 20° C., preferably less than 10° C., and even more preferably less than or equal to 5° C. Preferably, the preparation temperature of the precursor is generally a temperature of between −20° C. and 20° C., preferably between −7° C. and 10° C., and even more preferably between −5° C. and 5° C.

The silicon source that is used in stage (a) of the process according to the invention generally does not contain any impurity that could affect the synthesis of the zeolite. It is generally selected from the group that consists of pyrogenic silica, colloidal silica, precipitated silica, silicon alkoxides, sodium silicate, and the mixture of several of these sources.

The other framework elements are generally selected from the group that consists of boron, iron, titanium, phosphorus, gallium and aluminum. Preferably, this source of another framework element is an aluminum source.

The aluminum source that is generally used in stage a) of the process according to the invention generally does not contain any impurity that could affect the synthesis of the zeolite. It is generally selected from the group that consists of precipitated alumina, aluminum alkoxides, sodium aluminate, and the mixture of several of these sources.

The structuring organic compounds used in stage a) are generally quaternary ammoniums, preferably the tetramethylammonium $TMA^+$ ion.

The porous substrate can generally be used as a supply of reagents, optionally in combination with an outside supply of reagents.

Stage b)

This is a stage of bringing the precursor of stage a) into contact with the substrate by complete immersion of the substrate in the precursor before its gelling, preferably at a temperature of less than 20° C., preferably less than 10° C., and even more preferably less than or equal to 5° C.

Preferably, the temperature is between −20° C. and 20° C., preferably between −7° C. and 10° C., and even more preferably between −5° C. and 5° C.

The length of time of this stage of bringing the precursor into contact with the substrate is generally the length of time necessary to the gelling of the precursor at the selected temperature.

Stage c)

This is a stage in which the substrate that is obtained at the end of stage b) is brought into the presence of a gel-type or gel-suspension-type precursor, or a clear solution according to the preceding specifications w, x, y and z, whether the composition of this precursor is or is not the same as that of the precursor that is brought into contact with the substrate during stage b).

Stage c')

This is a stage of ageing of the impregnated substrate obtained at the end of stage b) at a temperature of between −20 and 50° C., preferably between 20 and 30° C., preferably for a necessary length of time so that the system attains equilibrium, preferably for a length of time of more than 12 hours, very preferably for a length of time of between 12 hours and 60 hours.

Stage d)

This is a stage for synthesis of the zeolite by hydrothermal treatment of the substrate that is obtained at the end of stage c), carried out while being stirred with putting the precursor and/or the substrate into motion, preferably with putting the substrate and the precursor into motion in an autoclave, at a temperature of between 20 and 250° C., preferably between 60 and 120° C., and more preferably between 85 and 100° C., for a length of time that is necessary for obtaining a zeolite membrane.

Generally, this length of time is 4 to 48 hours, preferably 10 to 14 hours for the gel-type or gel-suspension-type precursors.

Generally, this length of time is 144 to 600 hours, preferably 200 to 550 hours, for the clear-solution-type precursors that contain a structuring organic compound.

The terms synthesis of the zeolite and crystallization of the zeolite have the same meaning within the framework of this patent.

According to a variant, the substrate may have been modified so that porous populations or selected surfaces may be inaccessible to the crystallization process for the length of time of the crystallization.

Optional Stage d')

This is a stage, following stage d), for eliminating residual agents by calcination.

According to a variant, at the end of the cycle a) b) c) c') d), the stages c), c') and d) are repeated between 0 and 3 times. In this case, the gel-type precursor, the gel-suspension-type precursor, or the clear solution used for stage c) is not necessarily the same in each cycle. Preferably, the number of repetitions of these stages is equal to 2, preferably equal to 1, and even more preferably equal to 0. According to a variant, all or some of the stages d) are followed directly by a stage d').

According to a variant, the substrate is extracted from the reaction medium after stage b), excess gel is removed from its surface, a selected surface of the substrate or one or more zones of selected porosity of the substrate is modified either by covering the selected surface by a polymer film, preferably polytetrafluoroethylene, or by filling the zone or zones of selected porosity by a liquid, preferably epoxy resins, and in which the thus modified substrate then undergoes stages c) then c') then d).

First Preferred Method of Preparation

This is a process that comprises the following above-described successive stages: a), b), c), c') and d), optionally followed by stage d').

According to a variant of the first method of preparation, the precursor of stage c) is a clear solution according to the following specifications:

0.5 Na$_2$O: 1 Al$_2$O$_3$: 3.4 SiO$_2$: 400 H$_2$O: 2.46 (TMA)$_2$O

According to a variant of the first method of preparation, the substrate is extracted from the reaction medium after stage b), excess gel is removed from its surface, a selected surface of the substrate or one or more zones of selected porosity of the substrate is/are modified either by covering the selected surface with a polymer film, or by filling the zone or zones of selected porosity by a liquid. The thus modified substrate then undergoes stages c), c') and d).

According to a variant, at the end of the cycle a), b), c), c'), and d), the stages c), c') and d) are repeated between 0 and 3 times. In this case, the gel-type precursor, the gel-suspension-type precursor or the clear solution used for stage c) is not necessarily the same in each cycle. Preferably, the number of repetitions of these stages is equal to 2, preferably equal to 1, and even more preferably equal to 0. According to a variant, all or some of stages d) are followed directly by a stage d').

Second Preferred Method of Preparation

This is a process that comprises the following above-described successive stages: a), b), c'), d), c), c') and d).

According to a variant of the second method of preparation, the precursor of stage c) is a clear solution according to the following specifications:

0.5 Na$_2$O: 1 Al$_2$O$_3$: 3.4 SiO$_2$: 400 H$_2$O: 2.46 (TMA)$_2$O

According to a variant of the second method of preparation, the substrate is extracted from the reaction medium between the stages d) and c), excess gel is removed from its surface, a selected surface of the substrate or one or more zones of selected porosity of the substrate is/are modified either by covering the selected surface with a polymer film or by filling the selected porosity zone or zones by a liquid. The thus modified substrate then undergoes stages c), then c'), and then d).

According to a variant, at the end of cycle a) b) c') d), the stages c), c') and d) are repeated between 0 and 3 times. In this case, the gel-type precursor, the gel-suspension-type precursor, or the solution that is used for stage c) is not necessarily the same in each cycle. Preferably, the number of repetitions is equal to 2, preferably equal to 1, and even more preferably equal to 0. According to a variant, all or some of stages d) are followed directly by a stage d').

The invention also relates to the membranes that are obtained by the various methods of preparation.

Use of the Membranes According to the Invention

The separation is based on a kinetic discrimination (diffusion) and/or steric and/or thermodynamic exclusion (chemical affinity).

The invention also relates to a process for separating gases, vapors or liquids by using a membrane according to the invention.

In general, the processes perform the following separations:
Separation of aromatic compounds and naphthenes,
Separation of paraffins and olefins,
Separation of linear hydrocarbons and naphthenes, preferably the separation of paraffins and naphthenes,
Separation of paraffins and aromatic hydrocarbons,
Separation of isomers from xylene, Separation of the following gaseous mixtures: methane/nitrogen, methane/carbon dioxide, methane/carbon monoxide, carbon dioxide/carbon monoxide, and carbon dioxide/nitrogen, Separation of methane and sulfur-containing compounds, preferably the separation of methane/hydrogen sulfide or methane/COS, Separation of hydrogen/hydrocarbons, nitrogen/hydrocarbons, hydrogen/carbon dioxide, and hydrogen/carbon monoxide, Separation of oxidized organic molecules and water, preferably the separation of alcohols and water, Separation of alcohol and ethers.

The applications that involve the carbon oxides CO and CO2 and particularly the separations CO/H2, CO2/H2, CO/natural gas, CO2/natural gas, CO/CH4, CO2/CH4, CO/N2, and CO2/N2 are preferred.

The materials according to the invention make it possible to obtain very satisfactory separation performance levels. Such performance levels are evaluated with the measurement of the permeance of the $CO_2/N_2$ mixture under the following conditions:

Temperature: 30° C. to 100° C.,
Internal pressure: 0.12 MPa absolute to 1 MPa absolute,
External pressure: 0.1 MPa absolute,
Counter-current helium scavenging outside of the membrane between 0 and 12 nL/h.
Feedstock gas composition: 10 to 90% $N_2$ and 10 to 90% $CO_2$.

The limits of permeance and permselectivity provided below are considered to be inclusive.

Recall that the permeance of a gas, is expressed in $mol.m^{-2}.s^{-1}.Pa^{-1}$ is, by definition, the molar flow rate of this gas related to the unit of membrane surface area and related to the partial-pressure difference of this gas between the upstream (where the feedstock circulates) and the downstream (where the permeate is recovered). The permeance of a gas is therefore the molar flow rate of this gas that passes through the membrane per unit of surface area and pressure.

The materials according to the invention make it possible to obtain very satisfactory separation performance levels. Such performance levels are evaluated with the measurement of the permeance of the $CO_2/N_2$ mixture under the following conditions:

Temperature: 50° C.,
Internal pressure: 0.13 MPa absolute,
External pressure: 0.1 MPa absolute,
Counter-current helium scavenging outside of the membrane at 10 nL/h,
Feedstock gas composition: 50% $N_2$ and 50 $CO_2$.

Under these conditions, the $N_2$ permeances are generally at most $1.2.10^{-7}$ $mol.m^{-2}s^{-1}Pa^{-1}$, preferably at most $0.5.10^{-7}$ $mol.m^{-2}s^{-1}Pa^{-1}$, and the $CO_2$ permeances are at least $2.5.10^{-7}$ $mol.m^{-2}s^{-1}Pa^{-1}$ and preferably at least $5.10^{-7}$ $mol.m^{-2}s^{-1}Pa^{-1}$.

The membranes according to the first preferred embodiment exhibit, in the $CO_2/N_2$ separation, a $CO_2$ permeance of at least $3.10^{-7}$ $mol.m^{-2}s^{-1}Pa^{-1}$, preferably more than $7.10^{-7}$ $mol.m^{-2}s^{-1}Pa^{-1}$, and an $N_2$ permeance of at most $1.0.10^{-7}$ $mol.m^{-2}s^{m-1}Pa^{-1}$, preferably at most $0.6.$ $10^{-7}$ $mol.m^{-2}s^{-1}Pa^{-1}$.

The membranes according to the second preferred embodiment exhibit, in the $CO_2/N_2$ separation, a $CO_2$ permeance of at least $2.10^{-7}$ $mol.m^{-2}s^{-1}Pa^{-1}$, preferably more than $5.10^{-7}$ $mol.m^{-2}s^{-1}Pa^{-1}$, and an $N_2$ permeance of at most $0.3.10^{-7}$ $mol.m^{-2}s^{-1}Pa^{-1}$, preferably at most $0.15.10^{-7}$ $mol.m^{-2}s^{-1}Pa^{-1}$.

In general, the membranes according to the invention have a permselectivity on the $CO_2/N_2$ pair of at least 5, preferably at least 10, very preferably at least 20, and preferably at least 30.

In general, the membranes according to the first embodiment have a minimum pair ($CO_2$ permeance; permselectivity on the $CO_2/N_2$ pair ) corresponding to the pair ($7.5.10^{-7}$ $mol.m^{-2}s^{-1}Pa^{-1}$; 7.5).

In general, the membranes according to the second embodiment have a minimum pair ($CO_2$ permeance; permselectivity on the $CO_2/N_2$ pair) corresponding to the pair ($3.10^{-7}$ $mol.m^{-2}s^{-1}Pa^{-1}$; 16), preferably ($3.10^{-7}$ $mol.m^{-2}s^{-1}Pa^{-1}$; 20).

In the foregoing and in the examples, all temperatures are set forth uncorrected in degrees Celsius and, all parts and percentages are by weight, unless otherwise indicated.

EXAMPLES

In the examples below, the following reagents are used:
Tetramethylammonium hydroxide (TMAOH) in a solution of 40% by weight in water (Aldrich)
Sodium silicate in a solution of 27% by weight in water (Aldrich)
Tetraethyl orthosilicate (TEOS), 98% (Aldrich)
Solid sodium aluminate, 98% purity (Carlo Erba)
Aluminum isopropoxide, 98% (Aldrich)
Sodium hydroxide, 98% (Prolabo)
Porous substrate: In the cylindrical form of EM-type alpha-alumina T1-70 marketed by PALL-EXEKIA, formed by 3 layers of different porosities and exhibiting the following characteristics:
Length 15 cm,
Outside diameter 1 cm,
Inside diameter 0.7 cm,
Interior surface area of the substrate: 25 $cm^2$,
Thickness of the layers and mean size of the pores:
Inner layer: Thickness on the order of 20 μm and mean size of the pores: 0.2 μm;
Intermediate layer: Thickness on the order of 20 μm and mean size of the pores: 1 μm;
Outer layer: Thickness on the order of 1.7 mm and size of the pores: 12 μm.

Qualification of the Porous Substrates

In the following examples, the porous substrates are qualified before their use in the following way:

The presence of defects in the crack-type substrate may affect the formation of the zeolite layer and the properties of the zeolite membrane.

The absence of defects in the substrate is therefore verified before preparation of the membrane by bulloscopy. This test consists in visualizing the bubbling-through in a solvent of a gas that passes through the substrate and in measuring the flow rate of this gas based on the applied pressure. The substrate is immersed in ethanol, connected to a nitrogen line at one end, and plugged at the other. The selected substrate is deemed satisfactory when the bubbling-through and the flow of nitrogen are produced at a pressure difference of more than 0.4 MPa. The substrate is then dried in an oven at 100° C. for one night so as to evaporate the ethanol. It is called a qualified substrate below.

Heating and Stirring Device of the Reactors

In the following examples, the ageing as well as the crystallization can be carried out such that the gel or the gel suspension or the clear synthesis solution and the substrate are stirred. The heating and stirring device of the reactors allows an orbital stirring of the autoclaves around a horizontal axis such that the substrate rolls into the autoclave parallel to the axis and thereby stirs the reaction medium throughout the ageing and the crystallization. This device also allows the application of programmable heat treatments over a range of 30 to 250° C.

Example 1

According to the First Preparation Method of the Invention

A precursor mixture that is suitable for obtaining the FAU zeolite is prepared. To do this, 8.65 grams of NaOH and then 4.10 grams of sodium aluminate are dissolved in 48.3 grams of water, prepared freshly. This aluminum source solution is kept under cold conditions to stabilize it at 5° C. 38.9 grams of sodium silicate solution that is kept under cold conditions is taken to stabilize it at 5° C.

In preparation for being brought into contact, the aluminum and silicon sources are combined in a synthesis medium that is cryostatically kept at 5° C. The mixture is homogenized by stirring, 300 rpm, for 5 minutes, and then poured into the synthesis reactor that is cryostatically kept at 5° C.

A 150 mm EM T1-70-type Pall Exekia substrate that is sealed by enameling over 20 mm at each of its ends and qualified by bulloscopy is immersed in the medium. A vacuum of 0.4 mbar is applied to the reactor for 30 minutes to expel any air therein through the porosity of the substrate and to allow the still-liquid precursor to enter into all of the porosity ranges of the substrate.

At the end of one and one-half hours after silicon and aluminum sources are combined, the reaction medium gelled and caked inside and outside of the substrate to form a very cohesive gel that occupies the entire volume of the substrate, without liquid supernatant. Thus, regardless of the location of the medium where the gel is taken, the latter has the following molar composition:

6 Na2O: 1 Al2O3: 7 SiO2: 165 H2O

The substrate is extracted from the reaction medium, and excess gel is removed on its surface. The outside surface of the substrate is covered by a PTFE film to prevent exchanges with the reaction medium and the formation of a zeolite deposit on the outside face of the substrate. The substrate that is thus impregnated with gel and covered is placed in an autoclave that contains a clear solution. The latter is prepared in advance by dissolution of 4.85 grams of aluminum isopropoxide in 21.9 grams of a TMAOH solution that is 40% by weight, while being stirred vigorously, 500 rpm. In parallel, 8.41 grams of TEOS has been hydrolyzed in 58.6 grams of water for 18 hours while being stirred vigorously, 500 rpm. The aluminum and silicon sources have then been combined, and the mixture is homogenized by vigorous stirring, 500 rpm, for 1 hour. A clear solution that has the following molar composition is obtained:

0 Na2O: 1 Al2O3: 3.4 SiO2: 400 H2O: 2.46 TMA2O

The autoclave is closed, and then placed in the above-described heating and stirring device for 24 hours of ageing at 30° C. at 20 rpm, and then a 21-day crystallization at 90° C. at 20 rpm.

The membrane A that is obtained is washed by immersion in successive water baths, with each bath prepared freshly, and dried at 100° C.

Example 2

According to the Second Preparation Method of the Invention

A precursor mixture that is suitable for obtaining the FAU zeolite is prepared. To do this, 8.65 grams of NaOH, then 4.10 grams of sodium aluminate are dissolved in 48.3 grams of water, prepared freshly. This aluminum source solution is kept under cold conditions to stabilize it at 5° C. 38.9 grams of sodium silicate solution that is kept under cold conditions to stabilize it at 5° C. is taken.

In preparation for being brought into contact, the aluminum and silicon sources are combined in a synthesis medium that is cryostatically kept at 5° C. The mixture is homogenized by stirring, 300 rpm, for 5 minutes, and then poured into the synthesis reactor, an autoclave that is cryostatically kept at 5° C.

A 150 mm EM T1-70-type Pall Exekia substrate that is sealed by enameling over 20 mm at each of its ends and qualified by bulloscopy is immersed in the medium. A vacuum of 0.4 mbar is applied to the reactor for 30 minutes to expel any air therein through the porosity of the substrate and to allow the still-liquid precursor to enter into all of the porosity ranges of the substrate. At the end of one and one-half hours after silicon and aluminum sources are combined, the reaction medium gelled and caked inside and outside of the substrate to form a very cohesive gel that occupies the entire volume of the substrate, without liquid supernatant. Thus, regardless of the location of the medium where the gel is taken, the latter has the following molar composition:

6 Na2O: 1 Al2O3: 7 SiO2: 165 H2O

The autoclave is then placed in the above-described heating and stirring device. After ageing for 24 hours at 30° C. and 20 rpm, the synthesis of the zeolite takes place during a 12-hour crystallization at 85° C. The substrate that is loaded with zeolite seeds is then extracted from the reactor, washed by successive water baths, with each bath prepared freshly, and then dried at 100° C.

A clear growth solution is then prepared. 4.85 grams of aluminum isopropoxide is dissolved in 21.9 grams of a TMAOH solution that is 40% by weight, while being stirred vigorously, 500 rpm. In parallel, 8.41 grams of TEOS was hydrolyzed in 58.6 grams of water for 18 hours while being stirred vigorously, 500 rpm. The aluminum and silicon sources are then combined, and the mixture is homogenized by vigorous stirring, 500 rpm, for 1 hour. A clear solution that has the following molar composition is obtained:

0 Na2O: 1 Al2O3: 3.4 SiO2: 400 H2O: 2.46 TMA2O

The inoculated substrate is placed in an autoclave in the presence of this clear growth solution; the vacuum, 0.4 mbar, is applied to the reactor to flood all the porosity ranges of the substrate with the clear solution; then the autoclave is closed and placed in the above-described heating and stirring device. After ageing for 24 hours at 30° C. and 20 rpm, the synthesis of the zeolite takes place during a 21-day crystallization at 90° C.

The membrane B that is obtained is washed by immersion in successive water baths, with each bath prepared freshly, and dried at 100° C.

Example 3

According to the Second Preparation Method of the Invention

A precursor mixture that is suitable for obtaining the FAU zeolite is prepared. To do this, 8.65 grams of NaOH and then 4.10 grams of sodium aluminate are dissolved in 48.3 grams of water, prepared freshly. This aluminum source solution is kept under cold conditions to stabilize it at 5° C. 38.9 grams of sodium silicate solution that is kept under cold conditions is taken to stabilize it at 5° C.

In preparation for being brought into contact, the aluminum and silicon sources are combined in a synthesis medium that is cryostatically kept at 5° C. The mixture is homogenized by stirring, 300 rpm, for 5 minutes, and then poured into the synthesis reactor, an autoclave that is cryostatically kept at 5° C.

A 150 mm EM T1-70-type Pall Exekia substrate that is sealed by enameling over 20 mm at each of its ends and qualified by bulloscopy is immersed in the medium. A vacuum of 0.4 mbar is applied to the reactor for 30 minutes to expel any air therein through the porosity of the substrate and to allow the still-liquid precursor to enter into all of the porosity ranges of the substrate. At the end of one and one-half hours after silicon and aluminum sources are combined, the reaction medium gelled and caked inside and outside of the substrate to form a very cohesive gel that occupies the entire volume of the substrate, without liquid supernatant. Thus, regardless of the location of the medium where the gel is taken, the latter has the following molar composition:

6 $Na_2O$: 1 $Al_2O_3$: 7 $SiO_2$: 165 $H_2O$

The autoclave is then placed in the above-described heating and stirring device. After ageing for 24 hours at 30° C. and 20 rpm, the synthesis of the zeolite takes place during a 12-hour crystallization at 85° C. The substrate that is loaded with zeolite seeds is then extracted from the reactor, washed by successive water baths, with each bath prepared freshly, and then dried.

A clear growth solution is then prepared. 0.8 grams of NaOH and 4.85 grams of aluminum isopropoxide are dissolved in 21.9 grams of a TMAOH solution that is 40% by weight, while being stirred vigorously, 500 rpm. In parallel, 8.41 grams of TEOS was hydrolyzed in 58.6 grams of water for 18 hours while being stirred vigorously, 500 rpm. The aluminum and silicon sources are then combined, and the mixture is homogenized by vigorous stirring, 500 rpm, for 1 hour. A clear solution that has the following molar composition is obtained:

0.5 $Na_2O$: 1 $Al_2O_3$: 3.4 $SiO_2$ : 400 $H_2O$: 2.46 $TMA_2O$

The inoculated substrate is placed in an autoclave in the presence of this clear growth solution; the vacuum, 0.4 mbar, is applied to the reactor to flood all of the porosity ranges of the substrate with the clear solution; then the autoclave is closed and placed in the above-described heating and stirring device. After ageing for 24 hours at 30° C. and 20 rpm, the synthesis of the zeolite takes place during a 21-day crystallization at 90° C.

The membrane C that is obtained is washed by immersion in successive water baths, with each bath prepared freshly, and dried at 100° C.

Example 4

For Comparison

A membrane is prepared according to the synthesis method of Example 1, but without impregnating the substrate with the gel in advance.

The substrate is placed in an autoclave that contains a clear solution. The latter is prepared in advance by dissolution of 4.85 grams of aluminum isopropoxide in 21.9 g of a TMAOH solution that is 40% by weight, while being stirred vigorously, 500 rpm. In parallel, 8.41 grams of TEOS was hydrolyzed in 58.6 grams of water for 18 hours while being stirred vigorously, 500 rpm. The aluminum and silicon sources were then combined, and the mixture is homogenized by vigorous stirring, 500 rpm, for 1 hour. A clear solution that has the following molar composition is obtained:

0 $Na_2O$: 1 $Al_2O_3$: 3.4 $SiO_2$: 400 $H_2O$: 2.46 $TMA_2O$

The autoclave is closed, then placed in the above-described heating and stirring device for 24 hours of ageing at 30° C. at 20 rpm, then a 21-day crystallization at 90° C. at 20 rpm.

The material D that is obtained is washed by immersion in successive water baths, with each bath prepared freshly, and dried at 100° C.

Example 5

For Comparison

A membrane is prepared according to the synthesis method of Example 2, but without carrying out cold impregnation and seed crystallization in the pores of the substrate.

A clear growth solution is prepared. 4.85 grams of aluminum isopropoxide is dissolved in 21.9 grams of a TMAOH solution that is 40% by weight, while being stirred vigorously, 500 rpm. In parallel, 8.41 grams of TEOS was hydrolyzed in 58.6 grams of water for 18 hours while being stirred vigorously, 500 rpm. The aluminum and silicon sources are then combined and homogenized by vigorous stirring, 500 rpm, for 1 hour. A clear solution that has the following molar composition is obtained:

0 $Na_2O$: 1 $Al_2O_3$: 3.4 $SiO_2$: 400 $H_2O$: 2.46 $TMA_2O$

The substrate is placed in an autoclave in the presence of this clear growth solution; the vacuum, 0.4 mbar, is applied to the reactor to flood all of the porosity ranges of the substrate with the clear solution; then the autoclave is closed and placed in the above-described heating and stirring device. After ageing for 24 hours at 30° C. and 20 rpm, the synthesis of the zeolite takes place during a 21-day crystallization at 90° C.

The material E that is obtained is washed by immersion in successive water baths, with each bath prepared freshly, and dried at 100° C.

Example 6

For Comparison

The membrane is prepared according to the synthesis method of Example 1 but by carrying out the preparation and the impregnation of the precursor at 25° C.

A precursor mixture that is suitable for obtaining the FAU zeolite is prepared. To do this, 8.65 grams of NaOH and then 4.10 grams of sodium aluminate are dissolved in 48.3 grams of water, prepared freshly. This aluminum source solution is kept to stabilize it at 25° C. 38.9 grams of sodium silicate solution that is kept is taken to stabilize it at 25° C.

In preparation for being brought into contact, the aluminum and silicon sources are combined in a synthesis medium that is kept at 25° C. by thermostated bath. The mixture is homogenized by stirring, 300 rpm, for 5 minutes, and then poured into the synthesis reactor that is kept at 25° C. by thermostated bath.

A 150 mm EM T1-70-type Pall Exekia substrate that is sealed by enameling over 20 mm at each of its ends and qualified by bulloscopy is immersed in the medium. A vacuum of 0.4 mbar is applied to the reactor for 30 minutes to expel any air therein through the porosity of the substrate.

The gel has the following molar composition:

6 $Na_2O$: 1 $Al_2O_3$: 7 $SiO_2$: 165 $H_2O$

The substrate is extracted from the reaction medium, and excess gel is removed on its surface. The outside surface of the substrate is covered by a PTFE film to prevent exchanges with the reaction medium and the formation of a composite on the outside face of the substrate. The substrate that is thus impregnated with gel and covered is placed in an autoclave that contains a clear solution. The latter is prepared in advance by dissolution of 4.85 grams of aluminum isopropoxide in 21.9 grams of a TMAOH solution that is 40% by weight, while being stirred vigorously, 500 rpm. In parallel, 8.41 grams of TEOS has been hydrolyzed in 58.6 grams of water for 18 hours while being stirred vigorously, 500 rpm. The aluminum and silicon sources have then been combined, and the mixture is homogenized by vigorous stirring, 500 rpm, for 1 hour. A clear solution that has the following molar composition is obtained:

0 Na2O: 1 Al2O3: 3.4 SiO2: 400 H2O: 2.46 TMA2O

The autoclave is closed, and then placed in the above-described heating and stirring device for 24 hours of ageing at 30° C. at 20 rpm, then a 21-day crystallization at 90° C. at 20 rpm.

The material F that is obtained is washed by immersion in successive baths, with each bath prepared freshly, and dried at 100° C.

Example 7

For Comparison

The membrane is prepared according to the synthesis method of Example 2 but by carrying out the preparation and the impregnation stages of the precursor at 25° C.

A precursor mixture that is suitable for obtaining the FAU zeolite is prepared. To do this, 8.65 grams of NaOH and then 4.10 grams of sodium aluminate are dissolved in 48.3 grams of water, prepared freshly. This aluminum source solution is kept to stabilize it at 25° C. 38.9 grams of sodium silicate solution that is kept is taken to stabilize it at 25° C.

In preparation for being brought into contact, the aluminum and silicon sources are combined in a synthesis medium that is kept at 25° C. by thermostated bath. The mixture is homogenized by stirring, 300 rpm, for 5 minutes, and then poured into the synthesis reactor, an autoclave that is kept at 25° C. by thermostated bath.

A 150 mm EM T1-70-type Pall Exekia substrate that is sealed by enameling over 20 mm at each of its ends and qualified by bulloscopy is immersed in the medium. A vacuum of 0.4 mbar is applied to the reactor for 30 minutes to expel any air therein through the porosity of the substrate.

The gel has the following molar composition:
6 Na2O: 1 Al2O3: 7 SiO2: 165 H2O

The autoclave is then placed in the above-described heating and stirring device. After ageing for 24 hours at 30° C. and at 20 rpm, the synthesis of the zeolite takes place during a 12-hour crystallization at 85° C. The substrate that is loaded with zeolite seeds is then extracted from the reactor, washed by successive water baths, with each bath prepared freshly, and then dried.

A clear growth solution is then prepared. 4.85 grams of aluminum isopropoxide is dissolved in 21.9 grams of a TMAOH solution that is 40% by weight, while being stirred vigorously, 500 rpm. In parallel, 8.41 grams of TEOS was hydrolyzed in 58.6 grams of water for 18 hours while being stirred vigorously, 500 rpm. The aluminum and silicon sources are then combined and homogenized by vigorous stirring, 500 rpm, for 1 hour. A clear solution that has the following molar composition is obtained:

0 Na2O: 1 Al2O3: 3.4 SiO2: 400 H2O: 2.46 TMA2O

The inoculated substrate is placed in an autoclave in the presence of this clear growth solution; the vacuum, 0.4 mbar, is applied to the reactor to flood all the porosity ranges of the substrate with the clear solution; then the autoclave is closed and placed in the above-described heating and stirring device. After 24 hours of ageing at 30° C. and 20 rpm, the synthesis of the zeolite takes place during a 21-day crystallization at 90° C.

The material G that is obtained is washed by immersion in successive water baths, with each bath prepared freshly, and dried at 100° C.

Example 8

Performance Levels and Characteristics of the Materials Prepared According to Examples 1 to 7

Table 1 shows the performance levels of the materials that are prepared according to Examples 1 to 7.

The materials according to the invention make it possible to obtain very satisfactory separation performance levels. Such performance levels are evaluated using the measurement of the permeance of the $CO_2/N_2$ mixture under the following conditions:

Temperature: 50° C.,
Internal pressure: 0.13 MPa absolute,
External pressure: 0.1 MPa absolute,
Counter-current helium scavenging outside of the membrane at 10 nL/h,
Feedstock gas composition: 50% $N_2$ and 50% $CO_2$.

TABLE 1

Performance Levels of Prepared Materials

| Membrane or Material | CO2 Permeance $10^{-7}$ mol·m$^{-2}$·s$^{-1}$·Pa$^{-1}$ | Thickness of the Selective Zeolite Crystal Layer | Ratio r | Permselectivity on the $CO_2/N_2$ pair |
|---|---|---|---|---|
| A (Example 1) | 7.5 | 3 µm | 80% | 7.5 |
| B (Example 2) | 5 | 5 µm | 97% | 16 |
| C (Example 3) | 3 | 6 µm | 80% | 20 |
| D (Example 4) | 62 | No homogeneous membrane* | — | 1 |
| E (Example 5) | 68 | No homogeneous membrane* | — | 1 |
| F (Example 6) | 65 | No homogeneous membrane* | — | 1 |
| G (Example 7) | 67 | No homogeneous membrane* | — | 1 |

*Zeolite crystal agglomerates on the surface of the substrate that form a layer of non-contiguous agglomerates.

The ratio r is the ratio between the thickness of the selective zeolite layer detected in the surface porosity of a selected face of the substrate and the total thickness of the zeolite layer. So as to calculate the ratio r between the thickness of the selective zeolite layer detected in the surface porosity of a selected face of the substrate and the total thickness of the zeolite layer, 10 measurements are taken on membrane images obtained by scanning electron microscopy. The desired ratio r is thus obtained.

The materials of Examples 1, 2 and 3 have a good CO2 permeance and a good permselectivity on the $CO_2/N_2$ pair, whereby these results are in accordance with the performance levels that are expected for the membranes according to the invention. For these materials A, B and C, the location of the zeolite in the pores of the substrate combined with the nature of the substrate impart to the membrane an excellent thermal and mechanical capacity.

The materials that are prepared according to the preparation methods of Comparison Examples 4 to 7 do not show the separation capacity.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application No. 07/05.401, filed Jul. 24, 2007, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for preparation of FAU-structural type supported membranes that comprises the following stages:
stage a) preparation of a precursor of a FAU-structural type zeolite, said precursor being a gel precursor or a gel-suspension precursor, said precursor comprising at least one framework silicon source, at least one source of another framework element, at least one mineralizing agent, and at least one structuring organic compound, in which the molar composition of the gel or gel-suspension precursor is as follows:
1 $SiO_2$—w another framework element—x $H_2O$—y $Na_2O$=z structuring-organic-compound
w, x, y and z that respectively represent molar ratios of: another-framework-element/silica, water/silica, soda/silica structuring-organic-compound/silica, whereby
w is between 0 and 0.5, inclusive
x is between 5 and 1000, inclusive
y is between 0 and 80, inclusive
z is between 0 and 5, inclusive
in which, before gelling, the gel precursor or the gel suspension precursor is provided in clear, liquid form,
in which the precursor is prepared at a temperature of not more than 5° C.,
stage b) bringing the precursor of stage a) into contact, prior to gelling with a porous substrate by complete immersion of said porous substrate in the precursor before gelling, whereby this stage is carried out at −7 to 15° C. for a time sufficient to cause gelling of the precursor,
stage c) bringing the resultant substrate obtained at the end of stage b) into contact with a precursor of an FAU-structural type zeolite, said precursor being a gel precursor, a gel-suspension precursor, or a clear solution, complying with said values of w, x, y and z, said precursor of stage (c) being the same or different from the precursor brought into contact with the substrate during stage b),
stage c') ageing of resultant impregnated substrate obtained at the end of stage c) at a temperature of between −20 and 50° C.,
stage d) subjecting the substrate that is obtained at the end of stage c), to hydrothermal treatment in an autoclave with stirring of the precursor and/or the substrate at a temperature of between 85° C. and 100° C. for a sufficient time at said temperature to obtain a zeolite.

2. A process according to claim 1, in which y is between 1 and 8 for the gel or gel-suspension precursors and y is between 0 and 1 for the clear-solution precursors.

3. A process according to claim 1, in which stage b) is carried out at a temperature less than 10° C.

4. A process according to claim 1, further comprising the following stage:
stage d'), following stage d), for eliminating residual agents by calcination.

5. A process according to claim 1, in which said other-framework elements are any of boron, iron, titanium, phosphorus, gallium or aluminum, and the structuring organic compounds, in stage a), are any of tetramethylammonium (TMA) in hydroxide form or tetramethylammonium (TMA) in bromide form.

6. A process according to claim 1, in which the precursor of stage c) is a clear solution according to the following specifications:
0.5 Na2O: 1Al2O3: 3.4 SiO2: 400 H2O: 2.46 TMA2O.

7. A process according to claim 6, in which the substrate is extracted after stage b), excess gel is removed from its surface, a selected surface of the substrate or one or more selected porosity zones of the substrate is/are modified either by covering the selected surface by a polymer film, or by filling the zone or zones of selected porosity by a liquid, and in which the thus modified substrate then undergoes stages c) then c') then d).

8. A process according to claim 1, comprising successive stages a), b), c'), d), c), c') and d).

9. A process according to claim 8, in which the FAU precursor of stage c) is a clear solution according to the following mol ratios
0.5 $Na_2O$: 1 $Al_2O_3$: 3.4 $SiO_2$: 400 $H_2O$: 2.46 TMA2O.

10. A process according to claim 7, wherein the selected surface is covered by a polymer film.

11. A process according to claim 1, conducted under conditions such that an FAU-type zeolite crystal layer is incorporated in at least one selected face of the porous substrate, in which the ratio between the thickness of said zeolite layer incorporated in the surface porosity of said selected face of the substrate and the total thickness of said zeolite layer is at least 70%.

12. A process according to claim 1, wherein stage (b) is conducted at a temperature of about 5° C.

13. A process for preparation of FAU-structural type supported membranes that comprises the following stages:

stage a) preparation of a precursor of a FAU-structural type zeolite, said precursor being a gel precursor or a gel-suspension
precursor, said precursor comprising at least one framework silicon source, at least one source of another framework element, at least one mineralizing agent, and at least one structuring organic compound, in which the molar composition of the gel or gel-suspension precursor is as follows:

1 $SiO_2$—w another framework element—x $H_2O$—y $Na_2O$=z structuring-organic-compound w, x, y and z that respectively represent molar ratios of: another-framework-element/silica, water/silica, soda/silica structuring-organic-compound/silica, whereby w is between 0 and 0.5, x is between 5 and 1000, y is between 0 and 80, z is between 0 and 5, in which, before gelling, the gel precursor or the gel suspension precursor is provided in clear, liquid form, in which the precursor is prepared at a temperature that is less than 5° C., stage b) bringing the precursor of stage a) into contact, prior to gelling with a porous substrate by complete immersion of said process substrate in the precursor before gelling, whereby this stage is carried out at −7 to 15° C. for a time sufficient to cause gelling of the precursor, stage c) bringing the resultant substrate obtained at the end of stage b) into contact with a precursor of an FAU-structural type zeolite, said precursor being a gel precursor, a gel-suspension precursor, or a clear solution, complying with said values of w, x, y and z, said precursor of stage (c) being the same or different from the precursor brought into contact with the substrate during stage b), stage c') ageing of resultant impregnated substrate obtained at the end of stage c) at a temperature of between −20 and 50° C., stage d) subjecting the substrate that is obtained at the end of stage c), to hydrothermal treatment in an autoclave with stirring of the precursor and/or the substrate at a temperature of between 85° C. and 100° C., so as to obtain a zeolite.

14. A process according to claim 1, wherein the substrate is alumina qualified by bulloscopy.

15. A process according to claim 1, wherein stage (d) is conducted at about 90° C.

* * * * *